March 16, 1965 — D. R. SPENCER — 3,174,132
KEYBOARD CONTROLLED SIGNAL TRANSMITTER FOR MULTIPLEX SYSTEM
Filed Dec. 12, 1960 — 2 Sheets-Sheet 1

INVENTOR
DANA R. SPENCER
BY D. Kendall Cooper
ATTORNEY

March 16, 1965          D. R. SPENCER          3,174,132
KEYBOARD CONTROLLED SIGNAL TRANSMITTER
FOR MULTIPLEX SYSTEM
Filed Dec. 12, 1960                    2 Sheets-Sheet 2

United States Patent Office 3,174,132
Patented Mar. 16, 1965

3,174,132
KEYBOARD CONTROLLED SIGNAL TRANSMITTER FOR MULTIPLEX SYSTEM
Dana R. Spencer, Wappingers Falls, N.Y., assignor to International Business Machines Corporation, New York, N.Y., a corporation of New York
Filed Dec. 12, 1960, Ser. No. 75,162
5 Claims. (Cl. 340—147)

This invention relates to signal transfer systems, and more particularly to signal transfer circuitry which provides for synchronous transfer of asynchronous data signals to a utilization device.

The need frequently arises in data processing systems for the utilization of several types of data signals in a common utilization device, where some of the signals are automatically or semi-automatically provided in a synchronous manner to the utilization device, and where other data signals, on the other hand, originate from a manually operated or other asynchronous source. Data processing utilization devices for the purpose of this application, are considered to include a wide range of equipment, such as central processing units, multiplexing equipment, or similar equipment. Equipment of this nature usually operates in a synchronous manner, so that it moves through a predefined program, each step of which occurs in a regular cyclic order. Control signals which emanate from the device for directing various functions in the system, are also synchronous or cyclical in nature. Accordingly, data signals which are presented to the device for processing are preferably presented, and in most cases, of necessity, must be presented, in a synchronous manner which is correlated to the basic operational cycle of the device.

Generally, data signals originating at an automatic or semi-automatic source present no problem, since the source invariably operates in a cyclic manner also, and is readily controlled by the cyclic control pulses from the utilization device.

Serious timing problems exist, however, when it is desired to present data signals to the utilization device which originate from an asynchronous source, such as a manually actuated keyboard, being operated by a sales person, a clerk, or similar personnel.

Most data handling systems operate at high speeds, so that a typical cycle or step in the program would encompass a range of time intervals from a few microseconds to several hundred microseconds. A manually actuated data source has a relatively slow rate of operation, in addition to its asynchronism, so that data signals arising from a source of this kind will have a duration which extends over many cycles of operation of the utilization device. Thus, signals from the manually actuated source, such as a typewriter, may exist for a number of milliseconds, rather than microseconds, for each character entry that results from the depression of a key by the operator.

A number of signal synchronizing systems have been noted in the prior art. These systems have been based on various theories of operation, and have usually included unduly complex equipment, or have required that the utilization device respond to a wide diversity of signal transfer conditions. Some of the prior systems provide equipment for counting incoming signals, so that only particular ones of the incoming signals will be effective at the utilization device. Other prior are devices have made use of phase corrective procedures so that the basic operating cycle of the utilization device is made to correspond with the asynchronously arriving signals, rather than having the signals accommodate themselves to the utilization device. Other systems have required sequentially available clock pulses from the utilization device, which would have no application other than achieving synchronization between asynchronously available signals and the utilization device, and which thus represent additional, extensive hardware. Other synchronization systems have required that the signals from a number of sources, while arriving asynchronously with respect to one another, must each within its own group have a certain predetermined frequency or repitition rate; filters are provided so that the various signal groups may be presented to the proper channel. Finally, other prior art devices have required specialized circuitry such as particular types of timing oscillators, or delay elements, which have no application elsewhere in the system, and thus prevent attempts to standardize or to minimize the hardware necessary for satisfactory operation of the system.

Accordingly, an object of the invention is to provide a data processing system with improved signal transfer circuitry for handling asynchronous signals more effectively.

Another object of the invention is to provide improved signal transfer circuitry for establishing compatability between asynchronous signals and a synchronous utilization device.

A further object of the invention is to provide improved signal transfer circuitry which does not require specialized circuit elements, and which makes use of standard circuit blocks or components having a wide range of use throughout the rest of the system.

An additional object of the invention is to provide signal transfer circuitry which will supply accurate and sharply defined signals.

Another object of the invention is to provide a signal transfer circuit which will insure a single cyclic response at the utilization device, regardless of the duration of asynchronous signals supplied by an originating source.

Still an additional object of the invention is to provide signal transfer circuitry which will readily handle synchronously occurring signals, asynchronously occurring signals, and static signals of long duration.

It is another object of the invention to make use of readily available circuit blocks and components which inherently respond at a speed corresponding to that of the rest of the system, and which thus do not delay the rest of the system and in addition insure stable, trouble-free operation.

Still another object of the invention is to provide signal transfer circuitry which will establish transfer conditions during the first cycle of the utilization device which lies within the asynchronous time period.

A still further object of the invention is to provide signal transfer circuitry which will establish proper transfer conditions during the first cycle of the utilization device which lies wholly within an asynchronous time interval, and which will prevent further response by the utilization device on any subsequent cycles which may occur during the asynchronous time interval.

Another object of the invention is to provide signal transfer circuitry which becomes effective automatically for asynchronous data signals as they occur among various other types of signals in the system.

Also, another object of the invention is to provide signal transfer circuitry which is jointly controlled by synchronous control signals and asynchronous data signals.

In order to accomplish these and other objects, there has been provided in accordance with the present invention, a signal transfer circuit and an associated control circuit which are constructed of standard circuit blocks in a uniquely operative arrangement, which include a number of feedback control lines, and which because of their unusual arrangement, establish proper signal transfer conditions during the first synchronous cycle which occurs during an asynchronous interval and which, in addition, reject partial synchronous signals as well as all signals after a first accepted synchronous signal which occur within a given asynchronous interval.

The foregoing and other objects, features and advantages of the invention will be apparent from the following more particular description of the preferred embodiment of the invention as illustrated in the accompanying drawings.

DESCRIPTION

Figure 1:
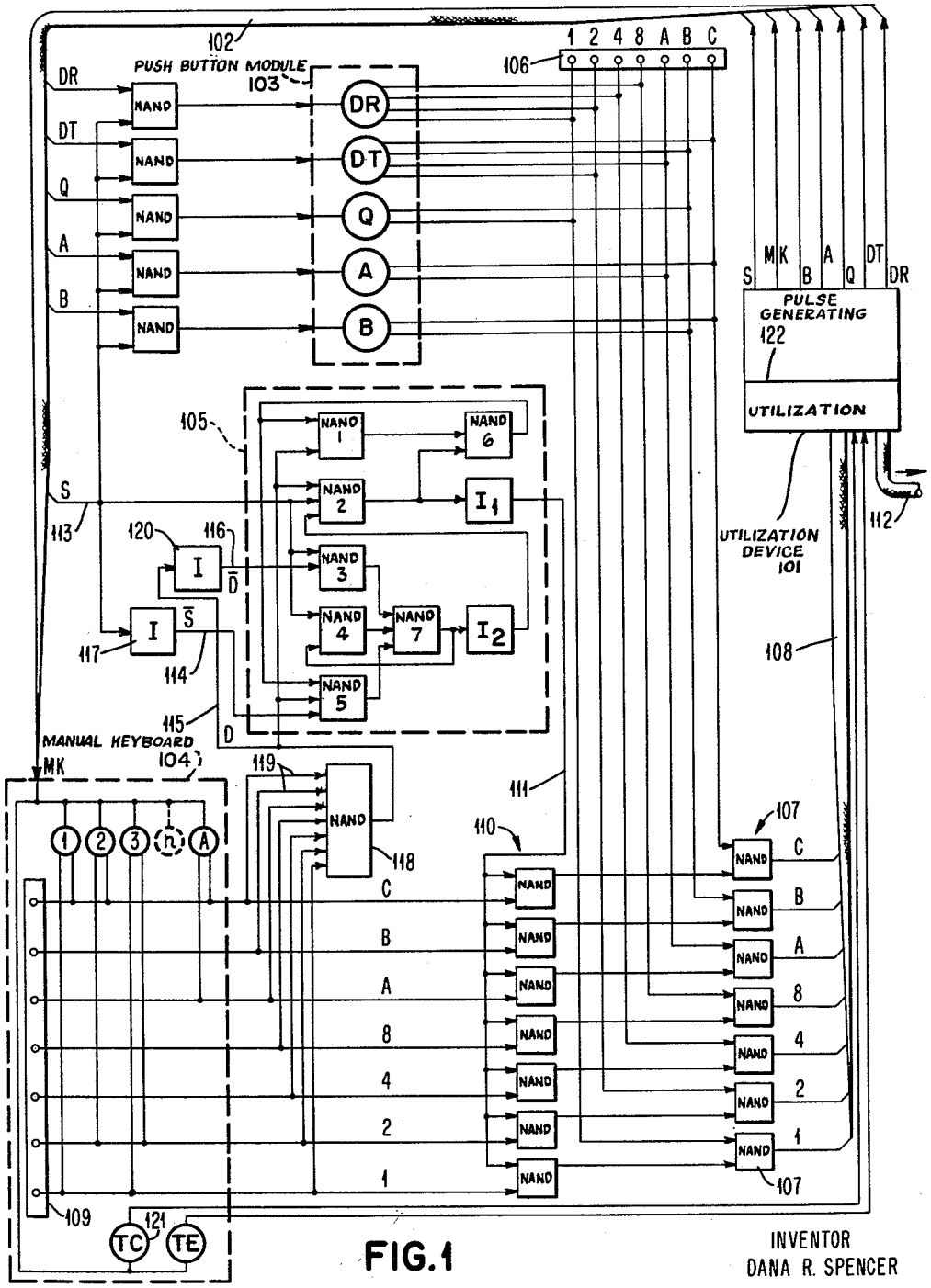
FIG. 1 represents a data processing system in which the invention is incorporated.

Referring to FIG. 1, a utilization device 101, which, for illustrative purposes, is a multiplexing unit, provides a number of sample pulses S and control pulses MK through DR which are directed through a cable 102 for sampling and controlling a push button module 103, a manual, asynchronous operable keyboard 104 and a signal transfer control unit, that is generally indicated by the dashed outline 105.

A number of buttons DR–B are provided in the push button module 103 and are typically used by an operator to set up standard control functions or commonly used informational headings which apply to variable information that is entered through the manual keyboard 104. The manual keyboard 104 has buttons 1–n, and an alphabetic button A, which is representative of the alphabetic buttons usually found on manual keyboards, typewriters, and similar entry devices.

The control unit 105 is made up of three basic blocks; a discriminating means 123, a recognition means 124 and an output circuit means 125. The discriminating means 123 including logic blocks $NAND_3$ $NAND_4$, the $NAND_7$ block and the $I_2$ block prevents an output from the signal transfer control unit 105 unless a data pulse exists prior to the occurrence of the leading edge of a sample pulse. The recognition means 124 which includes logic blocks $NAND_6$, $NAND_1$ and $NAND_5$ (operating through blocks $NAND_7$ and $I_2$ of the discrimination means) prevents the response of the signal transfer system to any subsequent sample pulses during the same data signal interval. Logic blocks $NAND_2$ and $I_1$ are included in the output circuit means 125 which, under the proper conditions of having present sample pulses on line 113, data pulses on line 115 and a gating impulse from block $I_2$, will provide Send Data signals through line 111 to the NAND blocks 110 of the data signal gating network.

In the illustrative embodiment, the manual depressions of the keys in the push button module 103, in conjunction with certain of the aforementioned sampling pulses S, and control lines B through DR from the multiplexer 101, establish unique code configurations on seven lines 1, 2, 4, 8, A, B, and C, which are attached to a terminal block 106. Impulses on these seven lines are then directed through a group of NAND blocks 107 and in parallel through a cable 108 to the multiplexer 101.

Similarly, depressions of the buttons in the manual keyboard 104 in conjunction with a control pulse MK, establish unique code permutations on seven lines 1, 2, 4, 8, A, B, and C, which are attached to a terminal block 109. The impulses on the lines 1–C from terminal block 109 are asynchronous in nature. Synchronization difficulties exist with respect to these impulses, in contrast with those which are available on the seven lines 1–C terminal block 106, from the relatively static keys in module 103 and which may be sampled by the multiplexer 101 without any synchronization problems.

The sample pulse and control pulse generating functions and the utilization functions, could be performed by separate units, as indicated by the line of separation 122 within the utilization device 101 in FIG. 1.

Synchronization for the impulses from the manual keyboard 104 is achieved by gating the pulses through a data signal gating network made up of a group of NAND blocks 110 and NAND block 107. A Send Data pulse on line 111 from the signal transfer control unit 105 controls the gating of data impulses from the keyboard 104 through the NAND blocks 110. The outputs from the various NAND blocks 110 are connected to inputs of the NAND blocks 107, which accept signals from the module 103 or from the keyboard 104 for transfer to the multiplexer 101 in parallel through the cable 108. In a typical case, the multiplexer 101 receives the impulses in parallel on the cable 108 and through internal circuitry, not shown, serializes the impulses for transmission over a line 112.

The Send Data pulse on line 111 from the signal transfer control unit 105 will be established only under certain conditions, in accordance with the voltage levels existing on a Sample (S) line 113, a Not Sample ($\overline{Sample}$ or $\overline{S}$) line 114, a Data (D) line 115, and a Not Data ($\overline{Data}$ or $\overline{D}$) line 116. Impulses are available on the Sample line 113 from the multiplexer 101 in a regular cyclic manner, determined by its basic cycle of operation. For purposes of illustration, it may be assumed that sample pulses are cyclically and regularly available on the line 113 ever 12.8 milliseconds, that they are square pulses, and that their duration is 300 microseconds. The $\overline{Sample}$ pulses occur each and every time that the Sample pulses occur and are simply derived from an inverter block 117.

A single Data pulse or data control pulse D is derived from a NAND block 118 whenever any impulse is present on one of the lines 119. These occur when gating line MK is active and a key on keyboard 104 is depressed. This sets up character impulses on the lines 1–C which are connected to the terminal block 109 and the lines 119 which are connected in parallel. As mentioned, the impulses on these lines are asynchronous in nature, due to the manual operation of the keyboard 104. In a typical case, the duration of the impulses on these lines is on the order of 27 milliseconds.

The Data pulses D, like the Sample pulses S, will also be considered to have a more or less square wave form. It will be apparent, from the inherent nature of operation of the manual keyboard 104 that the Data pulses D may occur at uncertain times with respect to the Sample pulses. S. If the time duration figures given above are used, the data pulses will have a duration of approximately ninety times the duration of the sample pulses. However, because of the uncertainty of occurrence, the leading edges and trailing edges of the data pulses will occur at varying times with respect to the sample pulses. The $\overline{Data}$ pulse or $\overline{Data}$ control pulse $\overline{D}$ on line 116 will have a time duration corresponding to the time duration of the Data control pulse D on line 115, and is derived from an inverter block 120.

If the entry devices 103 and 104 are installed at a sales location, the operator at the location would, in the event of a sales transaction, depress the Date DT, or Quantity Q, Group A, or Group B buttons on the push button module 103. In addition, the operator would depress the Data Ready button DR on module 103 to indicate that information is ready for transfer. It may be assumed that throughout the transaction, the Data Ready button DR will remain depressed. However, as various items are to be transferred by appropriate entry through the manual keyboard 104, the significance of each of the items will be indicated by the depression of the appropriate button in the module 103, such as Date, Quantity, Group A, or Group B. Thus, a sequence of entry operations by the agent might be as follows:

(1) Depress Date button DT and Data Ready button DR on the module 103
(2) Key in the date by means of the manual keyboard 104
(3) Depress Quantity button Q on the module 103
(4) Enter the quantity information by means of the manual keyboard 104
(5) Depress category Group A button or Group B button on the module 103
(6) Enter item name by means of the manual keyboard 104.

Usually, a greater number of buttons with a corresponding greater number of entry possibilities are provided on the push button module 103, but the number of buttons has been minimized in the circuit of FIG. 1, in order to simplify the description of the invention.

The seven bit code, according to which various permutations are established on the lines 1–C, is well known in the art at this time for representation of numeric, alphabetic and special character information, and is only one of many codes that could be used in practicing the invention. It is usually desirable to establish a parity for each character that is generated, and in this case an even parity is used. This means that if a particular character would generate only a single code permutation or an odd number of code permutations, the parity or check bit C is added to the character in order to insure an even number of permutations. This may be readily seen by referring to the lines extending to the right of the Data Ready DR button in the module 103, and noting that the character generated in this case consists of the bits 1, 2, 4 and 8, which add up to an even number of bits, that is, four. However, in the case of the Date character, DT, the lines extending to the right of the Date button would ordinarily only generate the bits 2, A, and B. There would only be three bits if the character lines were permitted to remain as generated. The C bit is added for this particular character, however, in order to develop an even number of bits, which in this case is also four. The same philosophy exists with respect to the generation of significant code permutations and the parity bit C from the buttons in the manual keyboard 104.

OPERATION

A typical sequence of operation of the invention will be described by referring to the diagram of FIG. 1, the enlarged signal transfer control circuit diagram of FIG. 2, and the waveforms of FIG. 3. The operator, as previously indicated, would ordinarily set up the buttons on the module 103 in FIG. 1 to initiate operations. If a transaction involved a sale of goods in category group A, the operator would first depress the group A or group B button, the Date button DT, or the Quantity button Q, if one or the other of these items is to be entered on the manual keyboard 104. The operator would then depress the Data Ready button DR as a final step.

The multiplexer 101 provides various control and sampling pulses through the cable 102, as mentioned, so that the buttons in the module 103 and the manual keyboard 104 may be interrogated. A Sample pulse S is available periodically and for purposes of describing this embodiment, may be assumed to occur every 12.8 milliseconds and to last for 300 microseconds. The scanning of the buttons in the module 103 would usually take place in a sequential manner so that the Data Ready button DR would be interrogated first, then the date button, then the quantity button, and then the group A and the group B button. The Sample pulse S would occur during each and every one of the gating times for the various buttons in 103. If the Data Ready button DR has been depressed, the code permutations resulting therefrom over the cable 108 would establish gating for recognizing the depression of the other buttons on the module 103 as well as for gating the manual keyboard 104 for manual entry by way of line MK. When the buttons DR through B have been sampled in the module 103, it may be assumed that a relatively constant gating pulse MK is then established, and that successive and repetitive samplings of the keys in the manual keyboard 104 will ensue until the Terminate Category (TC) button 121 on module 104 is depressed at which time another interrogation cycle is initiated starting with the Data Ready, the Date, and the other buttons in module 103 and again ending with repetitive sampling of the keys in the manual keyboard 104. When information has been entered with respect to each category, the completion of the transaction is indicated by depression of the Terminate Entry (TE) button. This signifies that all items related to a particular transaction have been entered. No circuitry in the multiplexer 101 is shown for accomplishing this since any of numerous well known circuit configurations could readily be provided for this purpose.

It may be assumed that the scanning of the Data Ready button DR and the Date category button DT has occurred in module 103. At this time the line MK would become active in order to provide a minus voltage level in the range of −6 to −12 for development of minus voltage levels on the data lines connected to terminal block 109 and the lines 119 in parallel to the NAND block 118, so that the date may be keyed in by the operator. The minus voltage levels on these lines would exist only while a particular button is depressed at the manual keyboard 104. As previously mentioned, this is typically of the order of 27 milliseconds, and asynchronous in nature.

During the time that the MK line is active, the relatively shorter impulses of 300 microsecond duration will be periodically available on the Sample line S.

It will be recalled from earlier discussion that it is necessary to derive a single data pulse only from any of the data lines connected to the terminal block 109 which are active during any key button depression interval. It is necessary in order to insure faithful and accurate transfer and reproduction of the data entered from the manual keyboard 104 that the developed impulses on the data lines have a duration which accurately corresponds to the Sample pulse from the multiplexer 101. In addition, it is necessary that no more than one set of data impulses is provided to the multiplexer 101 during a single depression of any key. The achievement of these goals in a simple and novel manner with the signal transfer control unit 105 may be realized by referring to the wave forms of FIG. 3. FIG. 3 represents typical wave forms which would exist during the interval that the manual keyboard 104 is activated by line MK. Data impulses resulting from depression of the keys in manual keyboard 104 are represented on the first line in FIG. 3 by the two square pulses 601 and 602, each of which would approximate 27 milliseconds in duration. The Sample pulses from the multiplexer 101 are shown in the second line of FIG. 3 as occurring in a regular cyclic manner, with their leading edges spaced an equal time interval apart. As previously mentioned, this might be in the order of 12.8 milliseconds. For purposes of this description, however, and because a 12.8 milli-second interval between sample pulses would require a larger number of sample pulses on the second line in FIG. 3, the sample pulses are shown in FIG. 3 as occurring perhaps 20 milliseconds apart. Even though the longer time interval is used, the principle of operation of the invention, and the signal transfer control circuit 105 of FIG. 1 is identical. In FIG. 3, various significant time demarcations are designated T–0, T–1, etc. through T–14.

While an understanding of the operation of the invention will be gained by reference to FIG. 2, which is an enlarged version of the signal transfer control unit, and by further reference to FIG. 3, which represents typical conditions existing in the transfer circuit during two data transfer intervals, a more complete understanding of the invention may be had by referring to tables I, II, III, IV, and V, which are presented directly below.

I. Data pulse leading edge occurring during first sample pulse but after sample pulse leading edge

[Result: No send data output]

| Time | S $\bar{S}$ D $\bar{D}$ Inputs | | Circuit Block Involved | Output | Result |
|---|---|---|---|---|---|
| T–1 | + – – + | + From S<br>+ From $\bar{D}$ | NAND$_3$ | – | Drive NAND$_7$ Output +. |
| | | + From NAND$_7$ | I$_2$ | – | Condition NAND$_2$ for Unchanged + Output when Data Pulse Occurs. |
| | | – From D<br>+ From S<br>– From I$_2$ | NAND$_2$ | + | NAND$_2$ Output +. |
| | | + From NAND$_2$ | I$_1$ | – | No Send Data. |
| T–2 | + – + – | + From NAND$_7$<br>+ From S | NAND$_4$ | – | Hold NAND$_7$ Output +. |
| | | + From NAND$_7$ | I$_2$ | – | Hold NAND$_2$ Output +. |
| | | + From D<br>+ From S<br>– From I | NAND$_2$ | + | NAND$_2$ Output +. |
| | | + From NAND$_2$ | I$_1$ | – | No Send Data. |
| T–3 | – + + – | – From S<br>+ From NAND$_7$ | NAND$_4$ | + | Drop NAND$_7$ Output to –. |
| | | – From NAND$_7$ | I$_2$ | + | To NAND$_2$. |
| | | + From I<br>+ From D<br>– From S | NAND$_2$ | + | Condition NAND$_2$ for Send Data on next sample Pulse. |
| | | + From NAND$_2$ | I$_1$ | – | No Send Data. |

II. Data pulse present when leading edge of second sample pulse occurs and first sample pulse was ineffective

[Result: Send data output]

| Time | S $\bar{S}$ D $\bar{D}$ Inputs | | Circuit Block Involved | Output | Result |
|---|---|---|---|---|---|
| T–4 | + – + – | + From I<br>+ From S<br>+ From D | NAND$_2$ | – | NAND$_2$ Output –. |
| | | – From NAND$_2$ | I$_1$ | + | Send Data Active. |
| | | – From NAND$_2$ | NAND$_6$ | + | Condition NAND$_1$ and NAND$_5$. |
| T–5 | – + + – | + From NAND$_6$<br>+ From D | NAND$_1$ | – | Hold NAND$_6$ Output +. |
| | | + From I<br>+ From D<br>– From S | NAND$_2$ | + | Change + A$_2$ Output to +. |
| | | + From NAND$_2$ | I$_1$ | – | Drop Send Data Line. |
| | | + From –O$_1$<br>+ From D<br>+ From $\bar{S}$ | NAND$_5$ | – | Drive NAND$_7$ Output +. |
| | | + From NAND$_7$ | I$_2$ | – | Hold NAND$_2$ Output + for Duration of Data Pulse. |
| T–6 | – + – + | – From D<br>+ From NAND$_6$ | NAND$_1$ | + | Drop NAND$_6$ Output to –. |
| | | – From S<br>+ From $\bar{D}$ | NAND$_3$ | + | Condition NAND$_7$ Output –. |
| | | – From S<br>+ From NAND$_7$ | NAND$_4$ | + | Condition NAND$_7$ Output –. |
| | | – From NAND$_6$<br>– From D<br>+ From $\bar{S}$ | NAND$_5$ | + | Condition NAND$_7$ Output –. |
| | | – From NAND$_7$ | I$_2$ | + | Condition NAND$_2$ for next sequence. |

III. No data pulse present for entire duration of sample pulse

[Result: No send data output]

| Time | S S̄ D D̄ Inputs | | Circuit Block Involved | Output | Result |
|---|---|---|---|---|---|
| T-7 | + − − + | + From S<br>+ From D̄ | NAND₃ | − | Drive NAND₇ Output +. |
| | | + From NAND₇<br>+ From S | NAND₄ | − | Hold NAND₇ Output +. |
| | | + From NAND₇ | I₂ | − | |
| | | − From D<br>+ From S<br>− From I₂ | NAND₂ | + | NAND₂ Output Unchanged. |
| | | + From NAND₂ | I₁ | − | No Send Data. |
| T-8 | − + − + | − From S<br>+ From D̄ | NAND₃ | + | Condition NAND₇ Output −. |
| | | − From S<br>+ From NAND₇ | NAND₄ | + | Condition NAND₇ Output −. |
| | | − From NAND₆<br>− From D<br>+ From S̄ | NAND₅ | + | Condition NAND₇ Output −. |
| | | − From NAND₇ | I₂ | + | Condition NAND₂ for next Data Sequence. |
| | | + From I<br>− From S<br>− From D | NAND₂ | + | NAND₂ Output + Unchanged. |
| | | + From NAND₂ | I₁ | − | No Send Data. |

IV. Data pulse present when first sample pulse occurs

[Result: Send data output]

| Time | S S̄ D D̄ Inputs | | Circuit Block Involved | Output | Result |
|---|---|---|---|---|---|
| T-9 | − + + − | + From I<br>+ From D<br>− From S | NAND₂ | + | Condition NAND₂ for Next Sample Pulse. |
| | | + From NAND₂ | I₁ | − | No Send Data. |
| T-10 | + − + − | + From I<br>+ From D<br>+ From S | NAND₂ | − | Change NAND₂ Output to −. |
| | | − From NAND₂ | I₁ | + | Send Data Active. |
| | | − From NAND₂ | NAND₆ | + | Condition NAND₁ and NAND₅. |
| | | + From NAND₆<br>+ From D<br>− From S̄ | NAND₅ | + | Condition NAND₅. |
| T-11 | − + + − | + From NAND₆<br>+ From D | NAND₁ | − | Hold NAND₆ Output +. |
| | | + From I<br>− From S<br>+ From D | NAND₂ | + | NAND₂ Output Changed to +. |
| | | + From NAND₂ | I₁ | − | Drop Send Data Line. |
| | | + From S̄<br>+ From NAND₆<br>+ From D | NAND₅ | − | Drive NAND₇ Output +. |
| | | + From NAND₇ | I₂ | − | Condition NAND₂ for no Response to Next Sample Pulse. |

V. *Data pulse present when second sample pulse occurs after first sample pulse was effective*

[Result: No send data output]

| Time | S $\overline{S}$ D $\overline{D}$ Inputs | | Circuit Block Involved | Output | Result |
|------|---|---|---|---|---|
| T-12 | + − + − | + From NAND₇<br>+ From S | NAND₄ | − | Hold NAND₇ Output +. |
| | | + From NAND₇ | I₂ | − | |
| | | + From D<br>+ From S<br>− From NAND₇ | NAND₂ | + | NAND₂ Output Unchanged. |
| | | + From NAND₂ | I₁ | − | No send Data. |
| T-13 | + − − + | − From D<br>+ From NAND₆ | NAND₁ | + | Decondition NAND₆. |
| | | + From NAND₁<br>+ From NAND₂ | NAND₆ | − | Change NAND₆ Output to −. |
| | | + From S<br>+ From $\overline{D}$ | NAND₃ | − | Additional Hold for NAND₇ Output −. |
| T-14 | − + − + | − From NAND₆<br>− From D | NAND₁ | + | Condition NAND₆ Output −. |
| | | − From D<br>− From S<br>− From I | NAND₂ | + | NAND₂ Output Unchanged. |
| | | + From NAND₂ | I₁ | − | No Send Data. |
| | | − From S<br>+ From $\overline{D}$ | NAND₃ | + | Condition NAND₇ Output −. |
| | | − From S<br>+ From NAND₇ | NAND₄ | + | Condition NAND₇ Output−. |
| | | − From NAND₆<br>− From D<br>+ From $\overline{S}$ | NAND₅ | + | Condition NAND₇ Output −. |
| | | − From NAND₇ | I₂ | + | Condition NAND₂ Input 3 for Next Sequence. |

Figure 2:
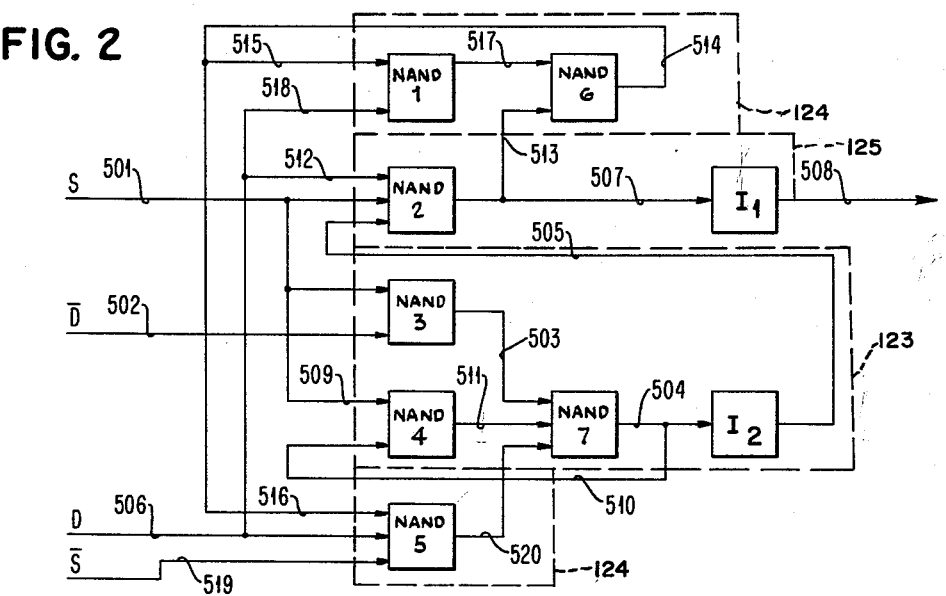
FIG. 2 represents a signal transfer control unit which is included in the system of FIG. 1.
Figure 3:
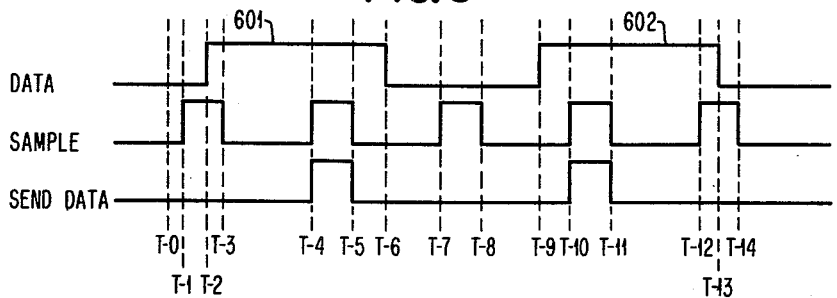
FIG. 3 represents typical signal conditions on several of the lines in the system of FIG. 1, and the signal transfer control unit of FIG. 2.

It will be noted that the aforementioned five tables I–V present significant chronological actions for the transfer circuit of FIG. 2 according to the various time demarcations of FIG. 3. Each of the tables is concerned with a particular set of the time demarcations. For example, Table I shows the various circuit actions at time T–1, T–2 and T–3. The status of the various sample and data lines coming into the circuit of FIG. 2 are also indicated alongside of each of the times listed. These are Samples (S), $\overline{\text{Sample}}$ ($\overline{S}$), Data (D), and $\overline{\text{Data}}$ ($\overline{D}$).

The various sample, data and circuit block outputs assume either an up level (+) or a down level (−), which in a typical case would be approximately zero volts, and approximately −6.0 to −12.0 volts, for the two conditions, respectively. In the Table I–V, the zero level is indicated by the plus sign, while the −6.0 to −12.0 volt level is indicated by the minus sign. In addition to the sample and data lines, and their inverted counterparts, other factors are shown in the tables, such as, the inputs to particular circuit blocks, an indication of the circuit block involved, the output from the circuit block, and the overall result as a consequence of this output.

Referring now to Table I, which represents conditions at time T–1, T–2 and T–3, and also referring to the corresponding times shown in FIG. 3, it will be seen that this table represents the conditions which exist in the transfer circuit of FIG. 2 when a Sample pulse arrives prior to, but extends beyond, the leading edge of the Data pulse.

For convenience, the circuit blocks of FIG. 2 have been given more specific designations, so that in addition to performing a basic logical function, their relative position in the circuit is indicated by means of a subscript. Thus, the NAND blocks are shown as NAND₁ through NAND₅. Similarly, the two inverter blocks are designated I₁ and I₂.

In Table I, and in FIG. 2 at T–1 time, the plus level on the S line 501 and the plus level on the $\overline{\text{Data}}$ line 502 condition the NAND₃ block to give a minus output on line 503. Since any negative input to the NAND₇ block will result in a plus output, the line 504 from NAND₇ becomes plus. The plus from NAND₇ on line 504 is inverted by I₂ and directed by line 505 to the lower input of the NAND₂ block. It will be recalled that since all inputs of any NAND block must be plus in order to get a minus output, the NAND₂ output will remain plus at this time due to the minus level on the data line 506 and the minus level from I₂ on line 505. The plus output from NAND₂ is directed on line 507 to the I₁ block for inversion and the output of the circuit in FIG. 2 on line 508 remains minus, so that no Send Data pulse is available at T–1 time on line 508, which corresponds to line 111 in FIG. 1.

For illustrative purposes, the Data pulse 601 in FIG. 3 is assumed to become available at time T–2 as a result of depression of a key on the manual keyboard. In Table I, it will be noted that even though the $\overline{\text{Data}}$ line 502 becomes minus at this time so that the NAND₃ block would have no output, the output of the NAND₇ block is held at a plus level through the NAND₄ block, as a result of the sample pulse on lines 501 and 509 as well as the feedback from the NAND₇ block to the NAND₄ block on line 510. Since the NAND₄ block will supply a minus input on line 511 to the NAND₇ block, the output of NAND₇ on line 504, will remain plus. The inversion of the plus output in line 504 by I₂, and by way of line 505, to NAND₂, insures that no change in the output from NAND₂ occurs, even though the Sample pulse exists on line 501 and the Data pulse exists on line 506 and 512 to NAND₂. As a result, no Send Data pulse is available on the line 508 at this time.

At time T-3, the first sample pulse drops. The output of NAND$_4$ on line 511 becomes a plus, and since the other inputs to NAND$_7$ were plus before, the output of NAND$_7$ on line 504 becomes minus. This becomes a plus level on line 505 after inversion by I$_2$. At this time, since the Data pulse 601 is still up, two inputs of NAND$_2$, that is the D input on line 512 and the I$_2$ input on line 505, are plus and NAND$_2$ is conditioned for the next sample pulse.

The next Sample pulse occurs at time T-4, as shown in Table II and in FIG. 3. Since all three inputs of NAND$_2$ are now plus, the NAND$_2$ output on line 507 becomes minus and after inversion by I$_1$, a Send Data pulse is available on line 508. Besides establishing a Send Data pulse, the output of NAND$_2$ is also directed on line 513 to NAND$_6$ for setting up a feedback which prevents further response to any sample pulses that might arrive during this Data pulse interval. The minus level from NAND$_6$ on line 513 to NAND$_6$ results in a plus output from NAND$_6$ on line 514 which is fed back to NAND$_1$ on line 515 and to NAND$_5$ on line 516.

The sample pulse that occurred at time T-4 drops at time T-5. As a result of the Sample dropping the output of NAND$_2$ becomes plus on line 507, and minus on line 508, after inversion by I$_1$. The output of NAND$_6$, however, is maintained at a plus level, as a result of a minus output from NAND$_1$ on line 517. This occurs because of the aforementioned feedback from NAND$_6$ on line 515, as well as the plus level on the data line 518 to the NAND$_1$ block. In Table II, it will be noticed that the plus level from NAND$_6$ on line 516, the plus level on the Data line 506, and the plus level on the $\overline{\text{Sample}}$ line 519 condition the NAND$_5$ block to provide a minus output on line 520 to the NAND$_7$ block. The plus output from NAND$_7$ on line 504, after inversion by I$_2$ becomes a minus level on line 505 to the NAND$_2$ block. This prevents any output from NAND$_2$ during this Data pulse interval even though another Sample pulse should occur on line 501. At time T-6 the Data pulse 601 drops. As a result of this, and the condition of the other lines in the circuit of FIG. 2, all NAND blocks are inactive so that they have plus outputs. Since NAND$_5$ becomes inactive, the NAND$_7$ block has a minus output. This is inverted by I$_2$ and established on line 505 to NAND$_2$ in order to condition this input of NAND$_2$ for the next sequence of pulses.

Table III concerns the circuit actions involved when a Sample pulse occurs with no Data pulse present. It will be noted at time T-7, when the Sample pulse rises, that an output will be derived from NAND$_3$ in order to drive NAND$_7$ output plus on line 504. It will also be noted that the output from the circuit of FIG. 2 on line 508 remains unchanged since the NAND$_2$ block has minus levels on the data line 512 and the I$_2$ line 505. At time T-8 when the Sample pulse drops, the circuit returns to the conditions corresponding to those which existed at time T-6, and is ready for the next Data pulse. Table IV lists the various actions involved when the Data pulse 602 rises at time T-9 and thus precedes the rise of the Sample pulse at time T-10. At time T-9 two inputs of NAND$_2$ are conditioned, that is, the Data input on line 512 is plus and the I$_2$ input on line 505 is also plus. No Send Data pulse occurs at this time. However, at time T-10 the Sample pulse rises and since all three inputs of NAND$_2$ are now continued, NAND$_2$ provides a minus level on line 507 to the inverter I$_1$, which in turn provides a plus level or Send Data pulse on the line 508. The Send Data pulse exists for the interval of time between T-10 and T-11.

It is necessary that response of the circuit be prevented to any other Sample pulses which may occur during the existence of the Data pulse 602. In a manner similar to that previously described, the block NAND$_6$ provides a plus feedback level on the lines 515 and 516 to NAND$_1$ and NAND$_5$, respectively, in order to achieve this purpose. The NAND$_6$ output is retained at a plus level through the action of the NAND$_1$ block, which provides a minus output on line 517. Thus, even though the Sample pulse drops at time T-11, the output of NAND$_6$ remains plus. In short, in Table IV it will be seen that with the fall of the Sample pulse at time T-11 the NAND$_2$ output becomes plus on line 507, and after inversion by I$_1$ becomes minus on line 508, which represents the termination of the Send Data pulse. Also, as previously considered, the $\overline{\text{Sample}}$ line 519 becomes plus, and since the Data line 506 and the NAND$_6$ line 516 are also plus, a minus output from NAND$_2$ is provided to NAND$_7$ on line 520. The NAND$_7$ output on 504 becomes plus, and the level on line 505 becomes minus after inversion by I$_2$. This deconditions the NAND$_2$ block, so that it will not respond to subsequently arriving Sample pulses during this Data pulse interval.

This is shown in Table V which lists the circuit conditions at time T-12, T-13, and T-14. At time T-12, the Sample pulse rises, and the $\overline{\text{Sample}}$ line falls to decondition the NAND$_5$ block. However, as a result of the feedback from NAND$_7$ on line 510 and the plus level on the Sample line 509 to the NAND$_4$ block and the resulting minus output to the NAND$_7$ block on line 511, the output of NAND$_7$ remains plus, and the level at the lower input of NAND$_2$ on line 505 remains minus, after inversion by I$_2$. The NAND$_2$ output thus remains unchanged at this time. At time T-13 the Data pulse 602 drops. As a result, several changes occur. The NAND$_1$ output becomes plus to decondition the NAND$_6$ block. Also, an additional hold for the NAND$_7$ block is established at this time as a result of the $\overline{\text{Data}}$ plus level on line 502 and the plus level on the sample line 501 to the block NAND$_3$. At time T-14 the circuit is restored to normal, with the fall of the Sample pulse it will be seen by referring to the Table V that the Send Data line 508 remains unchanged, and that the three inputs to NAND$_7$ are all plus, as a result of the deconditioning of the blocks NAND$_3$, NAND$_4$, and NAND$_5$. Since the output of NAND$_7$ becomes a minus, inversion by I$_2$ results in the application of a plus level on line 505 to the block NAND$_2$, in readiness for the next sequence of Data and Sample pulses.

It is evident from the foregoing discussion that a novel signal transfer configuration has been provided which insures the accurate transfer of data information regardless of its time occurrence with respect to synchronously generated sample pulses.

While the invention has been particularly shown and described with reference to a preferred embodiment thereof, it will be understood by those skilled in the art that various changes in form and details may be made therein without departing from the spirit and scope of this invention.

What is claimed is:

1. A signal transfer system for providing asynchronously available data signals to a synchronously operated utilization device which are compatible thereto comprising:

means for providing a series of cyclically recurring sample pulses;

asynchronously operable means for generating said asynchronously available data signals having a time duration which is at least as long as a cycle between successive ones of said sample pulses;

means responsive to any of said data signals during a given data interval for providing data control pulses;

means for inverting said data control pulses to derive Not-data control pulses;

a signal transfer control unit including a discriminating means responsive to particular predetermined combinations of said sample, data control and Not-data control pulses for generating a send data pulse only when said data signals exist prior to the occurrence of a said sample pulse, and recognition means responsive to the occurrence of said send data pulse within a particular data signal time interval for preventing the establishment of more than one of said send data pulses during a particular data signal time interval;

and a data signal gating network connected to the output of said asynchronously operable means for allowing the passage of said data signals to said utilization device in response to said send data pulse.

2. A signal transfer system for providing asynchronously available data signals to a synchronously operated utilization device which are compatible thereto comprising:

means for providing a series of cyclically recurring sample pulses;

means for inverting said sample pulses to derive Not-sample pulses;

asynchronously operable means for generating said asynchronously available data signals having a time duration which is at least as long as a cycle between successive ones of said sample pulses;

means responsive to any of said data signals during a given data interval for providing data control pulses;

means for inverting said data control pulses to derive Not-data control pulses;

a signal transfer control unit including a discriminating means responsive to particular predetermined combinations of said sample, data control and Not-data control pulses for generating a send data pulse only when said data signals exist prior to the occurrence of a said sample pulse, and recognition means responsive to the combination of said send data pulse, said Not-sample pulse and said data control pulse within a particular data signal time interval for preventing the establishment of more than one of said send data pulses during a particular data signal time interval;

and a data signal gating network connected to the output of said asynchronously operable means for allowing the passage of said data signals to said utilization device in response to said send data pulse.

3. A signal transfer system for providing asynchronously available data signals to a synchronously operated utilization device which are compatible thereto comprising:

means for providing a series of cyclically recurring sample pulses;

asynchronously operable means for generating said asynchronously available data signals having a time duration which is at least as long as a cycle between successive ones of said sample pulses;

a manually operable means for establishing the significance of a particular group of said data signals to said utilization device;

means responsive to any of said data signals during a given data interval for providing data control pulses;

means for inverting said data control pulses to derive Not-data control pulses;

a signal transfer control unit including a discriminating means responsive to particular predetermined combinations of said sample, data control and Not-data control pulses for generating a send data pulse only when said data signals exist prior to the occurrence of a said sample pulse, and recognition means responsive to the occurrence of said send data pulse within a particular data signal time interval for preventing the establishment of more than one of said send data pulses during a particular data signal time interval;

and a data signal gating network connected to the output of said asynchronously operable means for allowing the passage of said data signals to said utilization device in response to said send data pulse.

4. A signal transfer system for providing asynchronously available data signals to a synchronously operated utilization device which are compatible thereto comprising:

means for providing a series of cyclically recurring sample pulses;

asynchronously operable means for generating said asynchronously available data signals having a time duration which is at least as long as a cycle between successive ones of said sample pulses;

a manually operable means for establishing the significance of a particular group of said data signals to said utilization device;

means responsive to any of said data signals during a given data interval for providing data control pulses;

means for inverting said data control pulses to derive Not-data control pulses;

a signal transfer control unit including a discriminating means responsive to particular predetermined combinations of said sample data control and Not-data control pulses for generating a send data pulse only when said data signals exist prior to the occurrence of a said sample pulse, and recognition means responsive to the occurrence of said send data pulse within a particular data signal time interval for preventing the establishment of more than one of said send data pulses during a particular data signal time interval;

and means for terminating the said data signals to said utilization device for a period of time.

5. A signal transfer control circuit for gating asynchronously available data signals through a data signal gating network to a utilization device under control of a series of cyclically recurring sample pulses comprising:

means responsive to any of said data signals to provide a single data control pulse;

inverting means for deriving a Not-data control pulse from said data control pulse;

inverting means for deriving Not-sample pulses from said sample pulses;

discriminating means responsive to particular predetermined combinations of said sample, Not-sample, data control and Not-data control pulses for providing a gating impulse;

output circuit means responsive to the combination of said data control pulse, said sample pulse, and said gating impulse from said discriminating means for providing a send data pulse to said data signal gating network which allows said available data signals to pass to said utilization device;

and recognition means responsive to said send data pulse from said output circuit means for preventing subsequent send data pulses during a particular available data signal interval.

References Cited by the Examiner
UNITED STATES PATENTS

| | | | |
|---|---|---|---|
| 2,504,999 | 4/50 | McWhirter | 340—164 |
| 2,827,623 | 3/58 | Ainsworth | 340—147 |
| 3,016,516 | 1/62 | Doersam | 340—147 |

NEIL C. READ, *Primary Examiner.*

STEPHEN W. CAPELLI, *Examiner.*